(12) United States Patent
Inoue et al.

(10) Patent No.: US 7,613,863 B2
(45) Date of Patent: Nov. 3, 2009

(54) HIGH-SPEED DATA READABLE INFORMATION PROCESSING DEVICE

(75) Inventors: Hideo Inoue, Tokyo (JP); Isao Minematsu, Tokyo (JP); Takahiro Ikenobe, Tokyo (JP)

(73) Assignee: Renesas Technology Corporation, Tokyo (JP)

( * ) Notice: Subject to any disclaimer, the term of this patent is extended or adjusted under 35 U.S.C. 154(b) by 25 days.

(21) Appl. No.: 12/078,500

(22) Filed: Apr. 1, 2008

(65) Prior Publication Data
US 2008/0256267 A1 Oct. 16, 2008

Related U.S. Application Data

(63) Continuation of application No. 11/407,150, filed on Apr. 20, 2006, now Pat. No. 7,370,131.

(30) Foreign Application Priority Data
Apr. 22, 2005 (JP) ............................. 2005-125413

(51) Int. Cl.
*G06F 13/14* (2006.01)
*G06F 13/00* (2006.01)
(52) U.S. Cl. ..................... 710/305; 710/110; 710/27
(58) Field of Classification Search ............ 710/22–27, 710/52–56, 110–114, 305–310; 709/206, 709/212; 370/402
See application file for complete search history.

(56) References Cited

U.S. PATENT DOCUMENTS

| 5,056,005 | A | * | 10/1991 | Kaneko et al. ............... 711/109 |
| 5,509,127 | A | | 4/1996 | Datwyler et al. |
| 5,961,641 | A | * | 10/1999 | Hasegawa et al. ............... 713/1 |
| 6,654,385 | B1 | | 11/2003 | Odaka et al. |
| 6,901,469 | B2 | | 5/2005 | Ito |
| 2002/0133647 | A1 | * | 9/2002 | Kasper ........................ 710/29 |
| 2005/0204089 | A1 | * | 9/2005 | Chuang et al. ............... 711/100 |
| 2006/0271694 | A1 | | 11/2006 | Matsuo et al. |
| 2007/0159489 | A1 | | 7/2007 | Knepper |
| 2007/0230484 | A1 | | 10/2007 | Hu et al. |

FOREIGN PATENT DOCUMENTS

| JP | 6-161947 A | 6/1994 |
| JP | 11-85683 A | 3/1999 |
| JP | 2000-148661 A | 5/2000 |

* cited by examiner

*Primary Examiner*—Christopher Shin
(74) *Attorney, Agent, or Firm*—McDermott Will & Emery LLP

(57) ABSTRACT

A CAN module receives a message from a CAN bus to store the same in a message box unit of a message box. A reception request signal is output from the message box unit to a DMAC/IF. The DMAC/IF outputs a 7-bit encoded address together with a transfer request signal. A DMAC accesses a selected message box unit of the CAN module and a memory based on the transfer request signal and the 7-bit encoded address to transfer the message stored in the selected message box unit to the memory.

4 Claims, 4 Drawing Sheets

HIGH-SPEED DATA READABLE INFORMATION PROCESSING DEVICE

RELATED APPLICATIONS

This application is a Continuation of U.S. application Ser. No. 11/407,150, filed Apr. 20, 2006 now U.S. Pat. No. 7,370, 131, claiming priority of Japanese Application No. 2005-125413, filed Apr. 22, 2005, the entire contents of each of which are hereby incorporated by reference.

BACKGROUND OF THE INVENTION

1. Field of the Invention

The present invention relates to data transfer control of an information processing device and, more particularly, a direct memory access control system.

2. Description of the Background Art

In a conventional information processing device having a central processing unit, a main storage device and an I/O apparatus connected through a bus, when data transfer occurs with the I/O apparatus, the central processing unit issues an instruction to the I/O apparatus to execute processing of transferring information from the I/O apparatus to the main storage device through the bus.

In such a case, the central processing unit (CPU) should constantly monitor the I/O apparatus under its control to wait for the completion of the data transfer operation, so that load on the CPU might be increased to degrade performance of the system as a whole. In recent years, therefore, adopted for data transfer control is a direct memory access control system (hereinafter, also referred simply as a DMA) in which a main storage device is directly accessed from an I/O apparatus to transfer data without through a CPU.

Japanese Patent Laying-Open No. 2000-148661, Japanese Patent Laying-Open No. 11-085683 and Japanese Patent Laying-Open No. 06-161947 disclose the information processing devices adopting a DMA which enables high efficiency and improvement in performance of the system as a whole in data transfer to a main storage device.

On the other hand, as one I/O apparatus, a CAN (Controller Area Network) module has been drawing attention. A CAN module, which is mainly used for apparatus mounted on automobiles, is characterized in enabling information data communication having high reliability and safety.

It is a common practice for a conventional CAN module to have a structure in which a message received through a bus is stored in a message box as a memory embedded in the CAN module.

Therefore, adopted for a CPU is a system of directly accessing the message box from the CPU upon a notification of interruption when reception of a message is acknowledged in the CAN module. Since message information will be deleted once it is read by an access from the CPU, the structure in which transfer is made from a memory in the CAN module to a main storage device has not been adopted.

As described above, because the CPU adopts the system of directly accessing the memory in the CAN module, no reading from the CPU causes overwrite of the message box by a subsequently received message.

In addition, since in an access from the CAN module to the CPU, a received message is read through a low-speed peripheral bus, reading is executed at a very low speed.

SUMMARY OF THE INVENTION

An object of the present invention, which intends to solve the above-described problems, is to provide an information processing device enabling reliability of a received message of a CAN module to be further ensured by making use of DMA transfer, as well as enabling high-speed data reading.

The information processing device according to the present invention includes a main storage memory, a CPU for system, a high-speed system bus connected to the main storage memory and the CPU, a message box for receiving and temporarily storing at least one message, a memory access control circuit operable independently of the CPU and accessible to the main storage memory for transferring a message received at the message box, and a low-speed bus connected to the message box for transmitting a message. The message box outputs a message reception request upon receiving a message. The memory access control circuit accesses the message box and the main storage memory to transfer a message received in response to the message reception request and stored in the message box to the main storage memory.

The message box of the information processing device according to the present invention outputs a message reception request when receiving a message and the memory access control circuit transfers the message received in response to the message reception request to the main storage memory. Thus saving a message stored in the message box into the main storage memory prevents overwrite which will occur when no access is made by the CPU, thereby ensuring message reliability.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
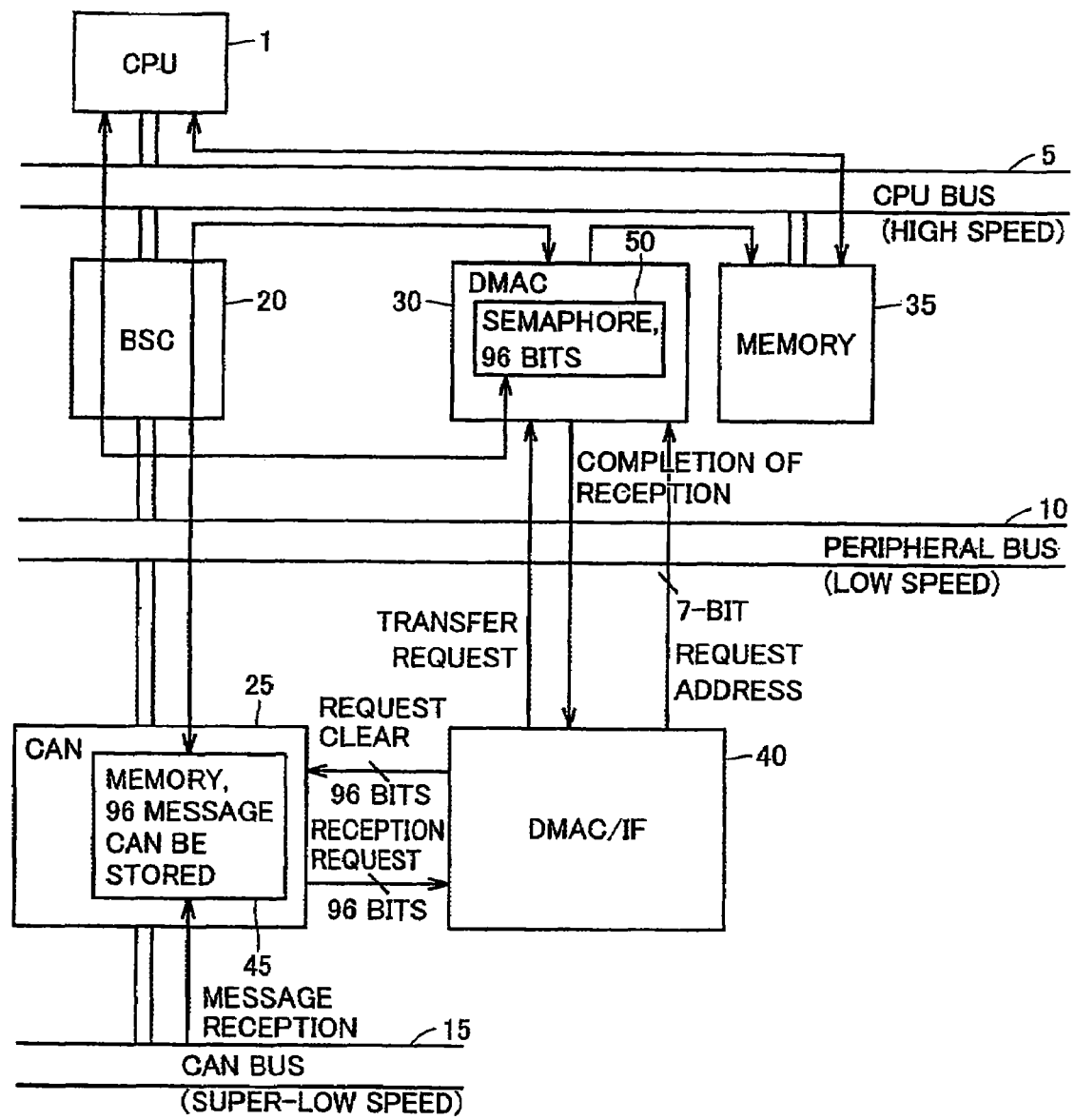
FIG. 1 is a schematic block diagram of an information processing device according to a first embodiment of the present invention.

In the following, embodiments of the present invention will be described in detail with reference to the drawings. In the drawings, the same or corresponding parts are indicated by the same reference numerals and the description thereof will not be repeated.

First Embodiment

With reference to FIG. 1, an information processing device according to a first embodiment of the present invention includes a central processing unit 1, a memory 35 as a main storage device, a CPU bus 5 as a high-speed bus for connecting the central processing unit 1 and the memory 35, a DMAC unit 30 connected to CPU bus 5 for executing DMA transfer, a peripheral bus 10 for use in low-speed data transfer with an external apparatus and the like, a bus controller (BSC) 20 for controlling connection between peripheral bus 10 and CPU bus 5, a CAN bus 15 on which message information is transmitted at an extremely low speed, and a CAN module 25 which is connected to CPU bus 5 through peripheral bus 10 and receives and stores message information from CAN bus 15. Further included is a DMAC interface (DMAC/IF) 40 which receives a reception request signal and the like from CAN module 25 and outputs a control signal and the like for DMA transfer to DMAC unit 30.

CAN module 25 and DMAC/IF 40 are directly connected using signal lines and DMAC unit 30 and the DMAC/IF are directly connected using a signal line as well.

CAN module 25 has a message box 45 as a memory in which message information is stored. Message box 45 is assumed to be formed of 96 message box units capable of storing 96 messages, respectively, though it is not shown in the figure. With an ID address as an identification of each message box unit assigned to each message box, the message box units are formed to compare their ID addresses with an ID address contained in message information received through CAN bus 15 such that the message is received at a message box unit corresponding to a coinciding ID address.

With the 96 message box units, reception completion flags are correlated. As described above, when message information transmitted through CAN bus 15 is received, an ID address is authenticated to store the message in a corresponding message box unit among the 96 message box units. Assume that at that time, a corresponding reception completion flag is set to "1", for example. Also assume that a reception completion flag of a message box unit in which a message is yet to be stored is set to "0", for example. The value indicative of the flag is not limited thereto and can be set to the reverse value.

Then, when in CAN module 25, a message is stored in a message box unit of message box 45, the reception completion flag is set to "1", based on which a reception request signals are output to DMAC/IF 40. Since reception request signals are output corresponding to the respective message box units, a 96-bit reception request signal is output to DMAC/IF 40. As will be described later, from DMAC/IF 40, a 96-bit request clear signal is output to CAN module 25. Based on the request clear signal, a message stored in the corresponding message box unit is cleared.

Upon receiving the reception request signal transmitted from CAN module 25, DMAC/IF 40 outputs a transfer request signal to DMAC unit 30. In addition, the DMAC/IF generates an ID address corresponding to the message box unit from which the reception request signal is output and outputs the same as a request address to DMAC unit 30. As will be described later, DMAC/IF 40 outputs the request clear signal to CAN module 25 upon application of a reception completion signal from DMAC unit 30.

DMAC unit 30 starts transfer operation based on the transfer request signal and a 7-bit request address received from DMAC/IF 40. More specifically, DMAC unit 30 accesses a message box unit coinciding with an ID address in message box 45 of CAN module 25 based on the 7-bit request address to start transfer operation of a message stored in the message box unit. At that time, bus controller 20 is controlled such that transfer is made from CAN module 25 to DMAC unit 30 through peripheral bus 10 and CPU bus 5. Then, DMAC unit 30 executes data write of the message in the message box unit which is transferred to DMAC unit 30 by directly accessing memory 35. Memory 35 has a predetermined storage region for message box 45. In a predetermined storage region, a message of each message box unit is stored.

Message of a message box unit written in a predetermined storage region of memory 35 keeps its data held until it is read (accessed) by CPU 1. After the access by CPU 1, the message is cleared from memory 35 because it is unnecessary.

CPU 1 determines whether a message of a message box stored in memory 35 is accessible or not based on written information in a semaphore storage unit 50 as will be described later of DMAC unit 30 which is obtained by accessing.

Semaphore storage unit 50 has 96 bits of semaphore values. The 96 bits of semaphore values correspond to the 96 message box units, respectively. CPU 1 makes determination of a corresponding semaphore value of semaphore storage unit 46 to determine whether to access a message of a message box unit written in a predetermined storage region of memory 35 described above. In addition, the semaphore value also serves as information for determination whether DMAC unit 30 is writable to memory 35.

More specifically, when a semaphore value is "0", DMAC unit 30 is writable to memory 35 and CPU 1 is brought to a read-disabled state. On the other hand, when the semaphore value is "1", the DMAC/IF resumes a scan of a subsequent reception completion bit for indicating that read is yet to be completed.

In addition, DMAC unit 30 outputs a reception completion signal to DMAC/IF 40 when the operation of transfer to memory 35 is completed. In response to the reception completion signal from DMAC unit 30, DMAC/IF 40 outputs a request clear signal to CAN module 25. CAN module 25 clears a reception completion flag corresponding to a message box unit selected in response to the request clear signal from DMAC/IF 40 to "0".

Figure 2:
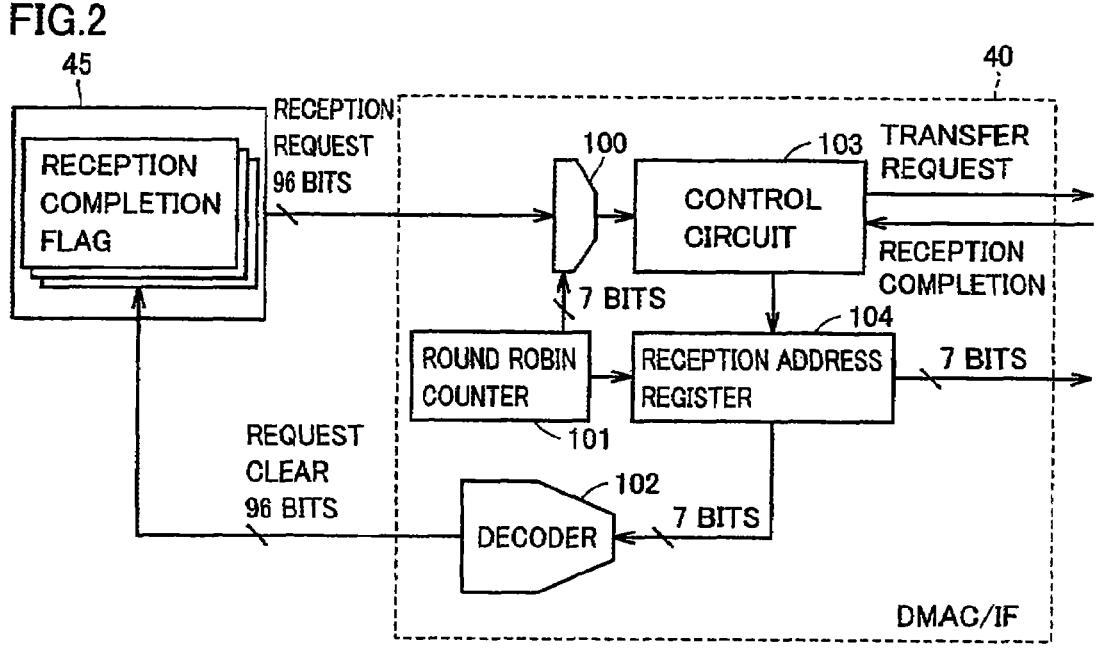
FIG. 2 is a conceptual diagram for use in explaining a relationship between a CAN module 25 and a DMAC/IF 40 according to the first embodiment of the present invention.

FIG. 2 is a diagram for use in explaining a relationship between CAN module 25 and DMAC/IF 40 according to the first embodiment of the present invention.

With reference to FIG. 2, DMAC/IF 40 according to the first embodiment of the present invention includes a round robin counter 101 for counting up to generate a 7-bit address, a selector 100 for selecting a reception request signal of corresponding one bit of a 96-bit reception request signal based on a 7-bit address generated by round robin counter 101, a control circuit 103 for receiving input of a reception request signal selected based on selection operation of selector 100, a reception address register 104 for holding a 7-bit address counted up by round robin counter 101, and a decoder 102 for decoding a 7-bit address from reception address register 104 to output a 96-bit request clear signal.

Control circuit 103 outputs a transfer request signal to DMAC unit 30 in response to a selected reception request signal from selector 100. In addition, control circuit 103 conducts control to output a 7-bit address held in reception address register 104 as a request address to DMAC unit 30 in response to a reception request signal applied from selector 100. Control circuit 103 also executes control to output a 7-bit address held in reception address register 104 to decoder 102 in response to a reception completion signal from DMAC unit 30. Decoder 102 conducts decoding based on a 7-bit address received from reception address register 104 to output a request clear signal to memory 45. For example, a request clear signal corresponding to one instruction signal line among 96 bits is set to "1" and a reception completion flag of a selected message box unit in message box 45 is set to "0". As a result, the message box unit is brought to a message receivable state through CAN bus 15.

Figure 3:
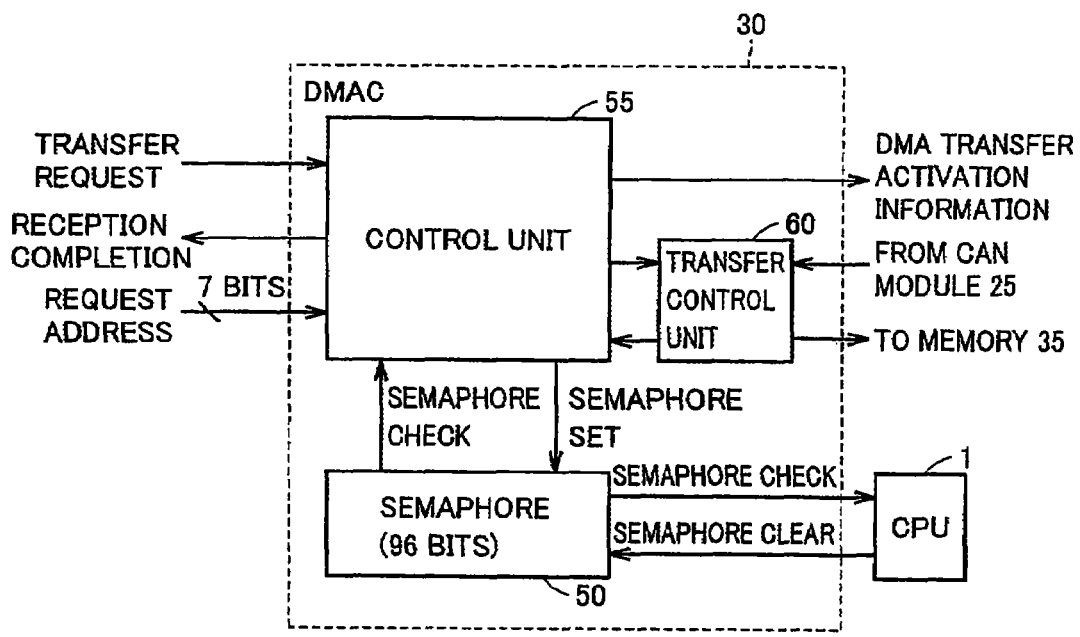
FIG. 3 is a schematic block diagram of a DMAC unit 30 according to the first embodiment of the present invention.

With reference to FIG. 3, DMAC unit 30 according to the first embodiment of the present invention includes a control unit 55, a semaphore storage unit 50 and a transfer control unit 60.

Control unit 55 outputs DMA transfer activation information as activation information for DMA transfer to CAN module 25 upon receiving a transfer request signal and a request address from DMAC/IF 40. The DMA transfer activation information includes a signal and an address of a trigger or the like for DMA transfer and CAN module 25 outputs a message of a selected message box unit to DMAC unit 30 through peripheral bus 10 and CPU bus 5 in response to the DMA transfer activation information.

Upon receiving a message from CAN module 25, transfer control unit 60 further outputs the message to be written to memory 35 through the CPU bus.

Semaphore storage unit 50 has the 96 semaphore values corresponding to the 96 message box units as described above. CPU 1 accesses semaphore storage unit 50 to execute semaphore check. More specifically, CPU 1 determines whether a message of the message box unit corresponding to a checked semaphore value is accessible to memory 35 or not. As described above, when the semaphore value is "0", determination is made that no effective message exists. On the other hand, when the semaphore value is "1", CPU 1 is brought to a readable state. Then, when accessing memory 35 by a message of the message box unit corresponding to the checked semaphore value, CPU 1 clears the semaphore value. More specifically, set the semaphore value from "1" to "0". (semaphore clear).

Control unit 55 checks a semaphore value stored in semaphore storage unit 50. More specifically, determine whether a message in a message box unit is writable to a predetermined storage region of memory 35 corresponding to the semaphore value (semaphore check). This is for checking whether the message is already read by CPU 1. When the semaphore value is "0", for example, control unit 55 determines that the message is writable to a predetermined storage region of memory 35. On the other hand, when the semaphore value is "1", control unit 55 determines that the message is not writable to a predetermined storage region of the memory. Control unit 55 determines whether to output DMA transfer activation information based on the check of the semaphore value. If the semaphore value is "1", resume a scan by DMAC/IF 40 without starting transfer.

On the other hand, in a case where a transfer request signal is applied when the semaphore value is "0", for example, control unit 55 outputs DMA transfer activation information, as well as controlling transfer control unit 60 to output a message transferred from CAN module 25 to memory 35. Transfer control unit 60 notifies control unit 55 of the completion of the transfer to memory 35 and control unit 55 responsively sets a semaphore value of a message box unit corresponding to the stored message to "1" (semaphore set). As a result, because the message transferred to memory 35 is locked by semaphore storage unit 50 to avoid overwrite, check of an overwrite flag executed at a conventional CAN module after reading of a received message needs no execution.

Figure 4:
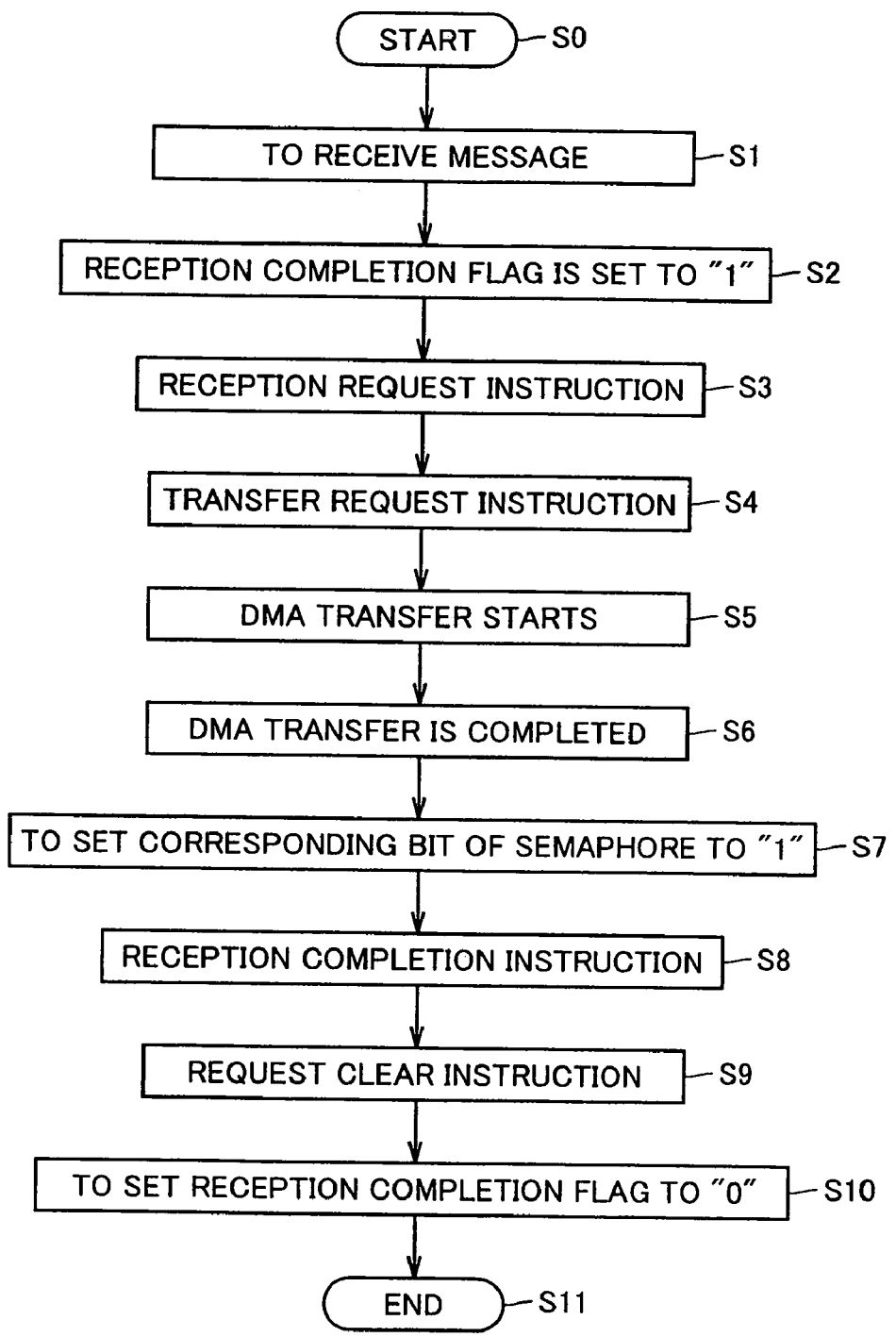
FIG. 4 is a flow chart for use in explaining data transfer of a message stored in a message box unit according to the first embodiment of the present invention.

With reference to the flow chart of FIG. 4, description will be made of data transfer of a message stored in the message box unit according to the first embodiment of the present invention.

Message is transmitted through CAN bus 15 (Start) (Step S0). At memory 45 of CAN module 25, the message is received (Step S1). Then, the message is stored in a message box unit having a coincident ID address in message box 45. Responsively, a reception completion flag corresponding to the message box unit is set to "1" (Step S2). As a result, a reception request signal is output from the message box unit whose reception completion flag is set to "1" to DMAC/IF 40 (reception request instruction) (Step S3).

DMAC/IF 40 receives the reception request signal from CAN module 25. Selector 100 outputs a reception request signal selected based on an address output from round robin counter 101 as described above to control circuit 103. Upon receiving the reception request signal selected by selector 100, control circuit 103 outputs a transfer request signal to DMAC unit 30, as well as instructing reception address register 104 to output a 7-bit request address (transfer request instruction) (Step S4).

DMAC unit 30 starts DMA transfer upon receiving the transfer request signal and the request address (Step S5). More specifically, control unit 55 first checks a semaphore value of semaphore storage unit 50 to determine whether the semaphore value is "0" (semaphore check). This is because when the semaphore value is "1", no message is writable to a corresponding predetermined storage region as described above.

When determining that the semaphore value is "0", control unit 55 outputs DMA transfer activation information to CAN module 25. The message is sent from a message box unit selected based on an address contained in the DMA transfer activation information to transfer control unit 60 of DMAC unit 30 through peripheral bus 10 and CPU bus 5. Then, the message is stored in a predetermined storage region of memory 35 through transfer control unit 60.

The foregoing completes DMA transfer (Step 6). Transfer control unit 60 notifies control unit 55 of the completion of the DMA transfer. Control unit 55 sets a corresponding semaphore value of semaphore storage unit 50 to "1" in response to the notification of the transfer completion from transfer control unit 60 (semaphore set) (Step S7).

Then, control unit 55 outputs a reception completion signal to DMAC/IF 40 (reception completion instruction) (Step S8). Control circuit 103 of DMAC/IF 40, in response to the reception completion signal from DMAC unit 30, controls and instructs reception address register 104 to output its held address to decoder 102.

Decoder 102 generates a request clear signal based on the address signal output from reception address register 104 and outputs the same to message box 45 through the instruction signal line (request clear instruction) (Step S9).

In response to the request clear signal output from DMAC/IF 40, message box 45 sets the corresponding reception completion flag to "0" (Step S10).

As a result, reception of a new message is again enabled through CAN bus 15 (Step S11).

With the structure according to the first embodiment of the present invention, once saving information of a message box unit stored in CAN module 25 into memory 35 as a main storage memory as a double buffer prevents a former message from being overwritten and erased by a new message transmitted through CAN bus 15 to keep the data. In addition, saving into memory 35 as a main storage memory allows CPU 1 to access main storage memory 35 and obtain message information, thereby enabling data read as high-speed access.

As the reception request signal of CAN module 25 according to the first embodiment of the present invention, which is described here to have 96 bits, for example, because a signal line for a reception request signal and a request clear signal, that is, a hand-shake signal line should be prepared, a total of 192 hand-shake signal lines are required.

This leads to a port/area increase to have a possibility of port neck when CAN module 25 and DMAC unit 30 are arranged on different chips.

Accordingly, for outputting an address corresponding to a message box unit as 7 bits by DMAC/IF 40 using the round robin counter to DMAC unit 30 in response to a reception request signal or a request clear signal, the number of signal lines can be reduced to seven.

In addition, since the first embodiment of the present invention is structured to output addresses at fixed time intervals in order by using the round robin counter, priority of the processing can be handled equally.

Second Embodiment

Figure 5:
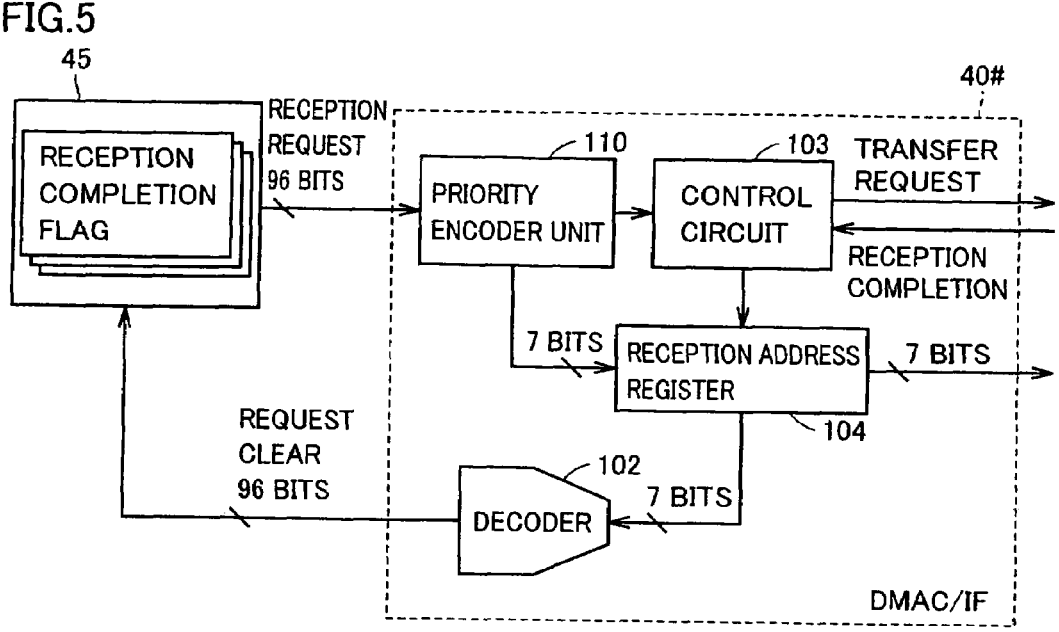
FIG. 5 is a diagram for use in explaining a DMAC/IF 40# according to a second embodiment of the present invention.

With reference to FIG. 5, a DMAC/IF 40# according to a second embodiment of the present invention is structured to have not a round robin counter but a priority encoder unit 110.

More specifically, as compared with DMAC/IF 40 described in FIG. 2, priority encoder unit 110 is provided in place of selector 100 and round robin counter 101.

Priority encoder unit 100 generates a preferential address based on priority and outputs the same to reception address register 104 in response to a 96-bit reception request signal. Reception address register 104 receives and holds the address output from priority encoder unit 110. Priority encoder unit 110 also notifies control circuit 103 in response to the reception request signal from the message box unit. Control circuit 103 outputs a transfer request signal to DMAC unit 30 in response to the reception notification from priority encoder unit 110. In addition, control circuit 103 controls reception address register 104 to output a 7-bit address to DMAC unit 30 together with the transfer request signal.

Since operation of control circuit 103 is the same as that described in FIG. 2, the detailed description thereof will not be repeated.

In the present example, when receiving a reception request signal corresponding to an address to which priority is assigned by using priority encoder unit 110, executing transfer operation giving preference to the message enables execution of transfer operation taking predetermined priority of message box units into consideration.

Figure 6:
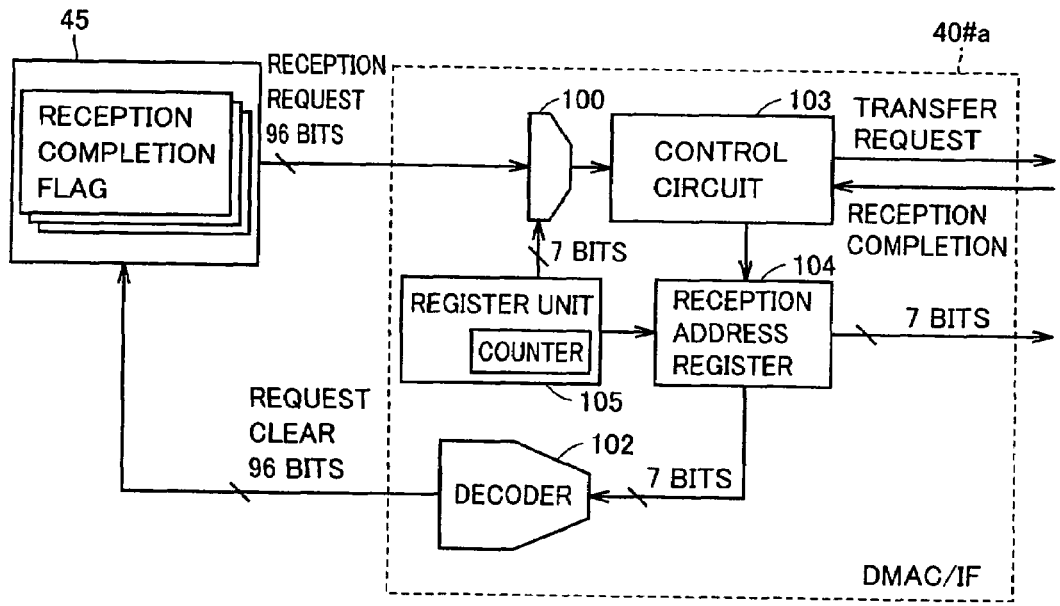
FIG. 6 is a diagram for use in explaining a DMAC/IF 40#a according to a modification example of the second embodiment of the present invention.

With reference to FIG. 6, a DMAC/IF 40#a according to a modification example of the second embodiment of the present invention is structured to have a register unit 105 in place of round robin counter 101. Register unit 105, which includes a counter, outputs a plurality of 7-bit addresses stored in register unit 105 in advance to selector 100 and reception address register 104 according to predetermined order based on a counter value counted up by predetermined timing.

Accordingly, only a message box unit corresponding to an address stored in register unit 105 will pass through selector 100 to execute the above-described DMA transfer. As to other message box unit whose address is not stored, when confirming reception of a message of other message box unit, the CAN module gives CPU 1 an interruption notification to cause a direct access from CPU 1 to the message box unit.

As is executed in the present structure, related to message box units, designating in advance a message box unit for which DMA transfer is executed eliminates the need of double-buffering all the message box units by using the above-described DMA transfer and prevents a meaningless scan, thereby enabling efficient execution of message transfer.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processing system comprising:
   a central processing unit;
   a data transfer control unit including an exclusive access control flag;
   a network interface unit; and
   a data transfer control unit interface coupled between the data transfer control unit and the network interface unit,
   wherein the network interface unit receives data from a network outside of the data processing system, and issues a data transfer request to the data transfer control unit via the data transfer control unit interface,
   wherein the data transfer control unit interface sets the exclusive access control flag in accordance with the request of the network interface unit,
   wherein the data transfer control unit transfer data received by the network interface unit to a memory, and
   wherein the central processing unit decides whether to be access or not to be access to the data in the memory based on the exclusive access control flag.

2. A data processing system according to claim 1, wherein the network interface unit includes a plurality of message boxes, each of which is used for receiving data from the network.

3. A data processing system according to claim 2, wherein the network interface unit includes a plurality of message receiving completion flags each of which corresponds to respective message boxes.

4. A data processing system according to claim 1, wherein each of the message boxes is adapted to receiving the corresponding data.

* * * * *

UNITED STATES PATENT AND TRADEMARK OFFICE
CERTIFICATE OF CORRECTION

PATENT NO. : 7,613,863 B2
APPLICATION NO. : 12/078500
DATED : November 3, 2009
INVENTOR(S) : Hideo Inoue et al.

It is certified that error appears in the above-identified patent and that said Letters Patent is hereby corrected as shown below:

On the title page item "(73) Assignee", change

"Renesas Technology Corporation" to --Renesas Technology Corp.--

Signed and Sealed this

Sixteenth Day of November, 2010

David J. Kappos
*Director of the United States Patent and Trademark Office*